Patented Apr. 6, 1954

2,674,540

UNITED STATES PATENT OFFICE 2,674,540

METHOD OF MAKING A WAX COMPOUND

Ralf B. Trusler, Dayton, Ohio, assignor to The Davies-Young Soap Company, Dayton, Ohio, a corporation of Ohio No Drawing. Original application May 26, 1949, Serial No. 95,562. Divided and this application May 18, 1950, Serial No. 162,807

4 Claims. (Cl. 106—271)

My invention relates to wax coatings for various supporting surfaces, but particularly for airplanes, automobiles and wood finished surfaces.

This application is a division of Serial No. 95,562, filed May 26, 1949.

It is an object of this invention to provide a composition in which waxes of a particular type are partially carried in solution and partially in suspension and which, when they are sprayed, have sufficient wetting action to bring about complete distribution and penetration in any voids, depressions or irregularities in metal or cloth.

It is another object of this invention to provide a composition in which, upon being sprayed, the wax in suspension will be retained in the voids, depressions and interstices of the supporting surfaces.

It is a further object of this invention that the wax in solution be capable of taking a polish as the solution dries and will form a smooth and protecting layer over the irregularities of the supporting surface and act as a seal for the wax in suspension in the voids, depressions and interstices of the supporting surface. Therefore, it is possible to use a light polish on a wax that has been so sprayed.

The result is that it is possible to not only provide a uniform and brilliant finish on the supporting surface, but to eliminate, in the case of airplanes as well as automobiles, icing under some conditions and to increase the speed of any plane or vehicle whose surface has been treated with the composition of this invention.

There are two types of wax—first, wing wax used on metal airplanes and on cloth airplanes. Generally speaking, this wax is used on a surface that has some degree of roughness, that is, it is not lacquered. The second type is used on automobiles which have the usual lacquered surfaces. These uses are not exclusive but they are typical.

In spray wax you must wet the surface to give initial adherence and thereafter it must be adaptable to a rubbing or wiping by a cloth that gives the final polish and causes the wax to adhere to the surfaces without smearing. (It is to be noted that if you use the composition on automobiles that is recommended for airplanes that you may get smearing—the explanation to this follows hereinafter.)

Prior waxes in the case of airplanes have used an emulsifier and usually have some water in solution. This has resulted in these waxes not sticking to the aircraft. They are soluble in rains, do not prevent icing and result in corrosion. Such waxes have some water soluble materials.

In the instant invention I have no water soluble materials.

Previous waxes of this type have the waxes all in suspension and none in solution. The physical advantage of my discovery of having the waxes partly in solution, but the major portion in suspension, will be indicated hereinafter.

This invention consists of a certain percentage of wax in suspension and a smaller percentage of wax in solution and the adjustment of relative percentages of total wax in pounds to total solvent in pounds according to the roughness of the surface, that is, for a rough surface like that of an aluminum airplane or cloth a larger percentage of wax is customarily employed to the total poundage of solvent than in the case of a lacquered surface that is smoother.

*Example I*

In wax to be used on airplanes, the ratio of wax to solvent is four pounds of wax to one hundred pounds of solvent.

The percentage of wax that is in solution is 12.5% of the total wax, while the balance of the wax, that is, 87.5% of the total wax, is in suspension.

The airplane type of wax under Example I is preferably a montanic ester of ethylene glycol with an acid number of 20 to 50. As a substitute a fatty acid ester, an oxidized petroleum, or an oxidized paraffin may be used. This wax is dissolved and suspended in a petroleum solvent. An example of such solvent is naphtha with a flash point of 85° to 90° and a limitation on flash point of not below 50°.

*Example II*

In wax that is used on automobiles the total wax is 2%, that is, two pounds out of every one hundred pounds of the total mix leaves 98 pounds for solvent. Of this amount of wax 20% of the total wax will go into solution and 80% will go into suspension.

A typical preferred wax is carnauba wax with an acid number of approximately 3 to 8.

*Example III*

2% of carnauba wax
Balance mineral spirits with a flash point of 85° to 86°.

The procedure is as follows:
The wax is melted and the solvent is added as the wax melts until 20% of the solvent intended to be used is added. The balance of the solvent is then added cold with rapid stirring in order to get the finest particles.

Example IV

Melt 20% of the wax that is to be used of the total of 2% in the ultimate mixture. Put the wax in the solvent and maintain the heat at 80° F. while stirring. Continue to add the wax at this heat while stirring. Then chill rapidly accompanied by rapid stirring.

Example V

4% of montanic ester of ethylene glycol known in the trade as I. G. Farben "I. G. Wax E."

The procedure is the same as that in either Example III or IV for the incorporating of the solvents and the waxes.

Example VI

Solvay waxes Nos. 3 to 11. These waxes are pure white, tough, and non-crystalline.

The procedure is to incorporate the wax and mineral spirits as in any one of the previous examples.

The essential feature of all these examples is to make the wax fine enough to spray so that the result will be approximately 20% of the wax utilized left in solution and 80% thereof in suspension.

One of the characteristics of the wax should be that it has limited solubility or controlled solubility.

The surface, when sprayed with the composition should be slightly wet and sufficient wax applied to cover the surface. The necessity for wetting the surface is to give initial adherence so that the composition will dry on the surface as a fine powder. When the wax is wiped by a cloth it polishes and will adhere to the surface without smearing. In this manner the wax in solution will give a polished surface and the wax in suspension in the solvent will enter the interstices, impressions, and pores of the surface.

It has been discovered in prior waxes which were sprayed on or rubbed that the low melting point would cause smearing and greater labor of application. It has been the practice to use a softer wax with the hard wax to plasticize the hard wax to make it softer. In some instances there has been used in the prior art a lubricating oils, a liquid fatty acid, or a stearic solid fatty acid to soften the wax. The problem thus encountered will explain to some degree the action of this invention as hereinafter pointed out.

There has also been used a neutral wax produced by Solvay chemical, numbers 5 to 11, which has no acid number. The montanic ester has an acid number of from 20 to 50. Carnauba wax has been used with an acid number of from 3 to 8 which is fully satisfactory.

It is desirable that the solvent used will not be affected by engine coolants, fuel or ice.

It is desirable to use a petroleum solvent in which the aromatic is kept down to prevent injury to the surface. It should have a solvency corresponding to Kauri Butanol #35.

The use of solvents is recommended that have three characteristics: (a) incapacity to absorb water; (b) a capacity not to be affected by alcohol, coolants and fuels; and (c) a capacity regularly to maintain a wax of given specification with a certain percentage in solution and a larger percentage in suspension. Such solvent should be so selected that it is possible to vary this relative amount in suspension and in solution automatically to facilitate ease of production to adapt the wax to different uses.

It has been discovered that on planes the instant invention has long life, will not, under some conditions, adhere to ice and accordingly prevents icing. It will also add to the speed of aircraft indicating that it reduces burbles and turbulence on wax surfaces.

The basic problem is to provide that in an aircraft in flight when the air passes over the plane surface that the Crookes layer will remain undisturbed. This insulating layer of relatively dead air permits of smooth aircraft operation and eliminates any burbles or turbulence due to the high speed air entering the minute irregularities on the surfaces of the aluminum or the fabric. This is probably the explanation for the reason why the instant invention increases air speed and prevents icing under certain conditions.

As there is no water in this mixture and as the surface of the airplane has been rendered completely smooth by this wax, filling the irregularities of aircraft surface, the Crookes layer is permitted to remain undisturbed. This also explains why physically, under certain conditions, there is no icing for the reason that (a) there is no anchorage for the ice in the irregularities of the plane surfaces; (b) there is no water for causing adherence of the ice, the water being derived from the former waxes; and (c) the undisturbed air layer acts as an insulator on the surface of the aircraft so that the icing conditions and the beginning of ice crystals cannot build up due to the fact that there is no water in the coating mixture.

This is confirmed by the examination of the structural conditions and the physical arrangement of this wax. Assuming it is an irregular aluminum surface when the wax is sprayed on that surface, the solvent and the wax in solution will enter and fill up the interstices and irregularities on the surface of the aluminum or the cloth. The body of wax in solution will be deposited on the under part of the irregularities of the aluminum and enclose the material that is in suspension in the depressions.

When there is a rub down as by the wiping of the cloth after spraying, the wax in suspension is not only anchored by the irregularities of the aluminum but also adheres more firmly due to its association with the wax of the solution derived from the solvent.

When the solvent dries there is a wax body that completely covers the surface of the aluminum above the top of the ridges or projections and is interlocked in the surfaces of the depressions of the aluminum or the fabric. This accounts for the fact that the solvent effect by the solvent on the wax by putting a part of it in suspension and a small part in solution is essential to the operation of a wax of this type and gives these unexpected results.

The range of pounds of wax to solvent, for instance, may vary from 2 to 6 pounds per about one hundred pounds of solvent depending upon the use and nature of the solvent.

While the forms of the invention illustrated herein constitute preferred forms of the invention, yet it will be understood that other forms of the invention can be produced without departing from the spirit and concept of the invention and the modifications that fall within the scope of the appended claims are intended to be included herein.

I claim:

1. In a method of making a fluid composition for use as a filling and finishing compound, which composition contains between about 2 to 6 pounds of a wax per about 100 pounds of a petroleum solvent having a solvency corresponding to Kauri Butanol #35, and which wax has an acid number of about 20 to 50 and is relatively insoluble in said solvent in the cold, the steps consisting of (a) melting the wax; (b) adding about 20 pounds of the solvent to the molten wax; and (c) cooling the mixture and adding the balance of about 80 pounds of the solvent while the mixture is cold accompanied by a rapid stirring in order to finely divide the wax in the solvent, whereby about 20% of the wax is in solution and about 80% of the wax is in suspension.

2. In a method of making a fluid composition for use as a filling and finishing compound, which composition contains about 2 pounds of carnauba wax per 100 pounds of mineral spirits having a solvency corresponding to Kauri Butanol #35 and which wax has an acid number of about 3 to 8, the steps consisting of (a) melting the carnauba wax; (b) adding about 20 pounds of the mineral spirits to the molten wax; (c) of cooling the mixture and adding the balance of about 80 pounds of the mineral spirits while the mixture is cold accompanied by rapid stirring to finely divide the wax in the mineral spirits, whereby about 20% of the wax is in solution and about 80% of the wax is in suspension.

3. In a method of making a fluid composition for use as a filling and finishing compound, which composition contains about 4 pounds of montanic ester of ethylene glycol per 100 pounds of naphtha having a solvency corresponding to Kauri Butanol #35, the steps consisting of (a) melting the montanic ester of ethylene glycol; (b) adding about 20 pounds of the naphtha to the molten montanic ester of ethylene glycol; (c) cooling the mixture and adding the balance of about 80 pounds of the naphtha while the mixture is cold accompanied by rapid stirring to finely divide the montanic ester of ethylene glycol in the naphtha, whereby about 20% of the montanic ester of ethylene glycol is in solution and about 80% of the montanic ester of ethylene glycol is in suspension.

4. In a method of making a fluid composition for use as a filling and finishing compound, which composition contains between about 2 and 6 pounds of a wax per 100 pounds of a petroleum solvent having a solvency corresponding to Kauri Butanol #35, which wax is relatively insoluble in the solvent in the cold and selected from the group consisting of waxes having an acid number in the range between 3 and 8 and waxes having an acid number in the range between 20 and 50, the steps consisting of (a) melting the wax; (b) adding a predetermined portion of the 100 pounds of petroleum solvent to the molten wax; and (c) cooling the mixture and adding the balance of the 100 pounds of petroleum solvent while the mixture is cold accompanied by a rapid stirring in order to finely divide the wax in the solvent, the amount of solvent added in steps (b) and (c) respectively being controlled so that, in the final composition, from 12.5% to 20% of the wax is in solution and from 80% to 87.5% of the wax is in suspension.

References Cited in the file of this patent

UNITED STATES PATENTS

| Number | Name | Date |
| --- | --- | --- |
| 2,214,263 | Weihe | Sept. 10, 1940 |
| 2,311,338 | Holtsclaw et al. | Feb. 16, 1943 |
| 2,596,829 | Trusler | May 13, 1952 |